United States Patent
Wang et al.

(10) Patent No.: US 12,554,412 B1
(45) Date of Patent: Feb. 17, 2026

(54) DATA STORAGE DEVICE SELECTION

(71) Applicant: Beken Corporation, Shanghai (CN)

(72) Inventors: Weifeng Wang, Shanghai (CN); Pujie Yang, Shanghai (CN); Caogang Yu, Shanghai (CN)

(73) Assignee: Beken Corporation, Shanghai (CN)

( * ) Notice: Subject to any disclaimer, the term of this patent is extended or adjusted under 35 U.S.C. 154(b) by 0 days.

(21) Appl. No.: 19/169,192

(22) Filed: Apr. 3, 2025

(30) Foreign Application Priority Data

Mar. 18, 2025 (CN) .......................... 202510326382.5

(51) Int. Cl.
*G06F 3/06* (2006.01)

(52) U.S. Cl.
CPC .......... *G06F 3/0613* (2013.01); *G06F 3/0656* (2013.01); *G06F 3/0673* (2013.01)

(58) Field of Classification Search
CPC ..... G06F 3/0613; G06F 3/0656; G06F 3/0673
See application file for complete search history.

(56) References Cited

U.S. PATENT DOCUMENTS

| | | | |
|---|---|---|---|
| 2021/0397371 A1* | 12/2021 | Ballapuram | G06F 3/0659 |
| 2024/0272826 A1* | 8/2024 | Singer | G06F 12/0246 |
| 2025/0126378 A1* | 4/2025 | Lin | H04N 23/651 |

FOREIGN PATENT DOCUMENTS

CN 115910147 A * 4/2023

OTHER PUBLICATIONS

Translation of CN_115910147 (Year: 2023).*

* cited by examiner

*Primary Examiner* — Zhuo H Li
(74) *Attorney, Agent, or Firm* — Schwegman Lundberg & Woessner, P.A.

(57) ABSTRACT

A system may include multiple kinds of storage devices, such as a pseudostatic random-access memory (PSRAM) and a static random access memory (SRAM). A technique for data exchanges may include receiving a write request to store data in storage device, selecting a storage device among one or more storage devices. The data may be stored in the selected device. The method may include receiving read requests and returning data from appropriate storage devices. In some examples, the system may decide where to store data based on factors such as data size, data type, or address proximity, potentially optimizing memory usage, balancing speed, capacity, or power efficiency. The systems and techniques described herein may be particularly beneficial for devices with limited resources like system on chip (SoC) systems.

20 Claims, 4 Drawing Sheets

DATA STORAGE DEVICE SELECTION

CROSS-REFERENCE TO RELATED APPLICATIONS

This application claims priority to and incorporates by reference Chinese patent application no. 202510326382.5 filed Mar. 18, 2025.

TECHNICAL FIELD

The systems and techniques described herein relate to computing systems and, more particularly, to system-on-chip (SoC) systems.

BACKGROUND

A system-on-chip (SoC) system may be used within an Internet of Things (IoT) device. An SoC system may include a processor, a memory, and input or output components.

IoT devices may connect or communicate with each other or a server. An example of an IoT device may be a sensor that monitors environmental condition, a smart home controller, or a wearable device. An IoT device may be implemented with an SoC system configured to perform a variety of tasks, such as data collection, processing, or communication. An SoC system typically maintains low power consumption and a small physical footprint.

BRIEF SUMMARY

The systems and techniques described herein relates to a computing system that comprises one or more processors; a controller; and one or more storage devices comprising: a first storage device that comprises a static random access memory (SRAM); a second storage device that comprises a pseudostatic random-access memory (PSRAM) coupled to the controller, a performance metric of the SRAM being greater than the PSRAM and a capacity attribute of the SRAM being smaller than the PSRAM; and a cache memory coupled to the controller, the one or more storage devices storing instructions that, when executed by the one or more processors, configure the computing system to receiving, by the one or more processors, a write request to store data in a memory address; selecting, by the one or more processors, a storage device among one or more storage devices to store the data based the memory address; and storing the data in the selected storage device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The systems and techniques described herein may address several technical problems associated with data exchanges in a computing system, particularly those with limited resources. A problem may be the trade-off between performance and capacity in different types of memory. The static random access memory (SRAM) may offer superior performance but limited capacity, while the pseudostatic random-access memory (PSRAM) may provide larger capacity but slower performance. To address this technical problem, the computing system may implement a hybrid setup that includes both SRAM and PSRAM, allowing for efficient utilization of both memory types based on specific data characteristics or access patterns.

Another problem may be optimizing data storage and retrieval in systems with limited resources, such as IoT devices or SoCs. The technical solution described herein may involve selection of storage devices based on factors like data size, type, and memory address.

For example, smaller, frequently accessed data may be stored in the faster SRAM or cache memory, while larger datasets may be directed to the PSRAM.

In some examples, combining SRAM and PSRAM directly may not be an optimal solution due to the inherent differences in their performance characteristics. The PSRAM may incur significant overhead costs during data exchanges, which could potentially slow down overall system performance. These overhead costs may include additional time required for read/write operations.

To address this technical challenge, the system may implement a controller with a cache memory or buffer as an intermediary for the PSRAM, allowing the overall system to manage data storage or retrieval operations more efficiently. By utilizing the cache memory or buffer within the controller, the system may mitigate the impact of higher overhead costs on overall performance. The systems and techniques described herein may enable the computing system to leverage the benefits of PSRAM, while minimizing the performance bottlenecks associated with direct PSRAM access. The controller may optimize data exchanges and reduce overhead costs, potentially enhancing overall performance and energy efficiency in computing systems like IoT devices or SoCs.

Figure 1:
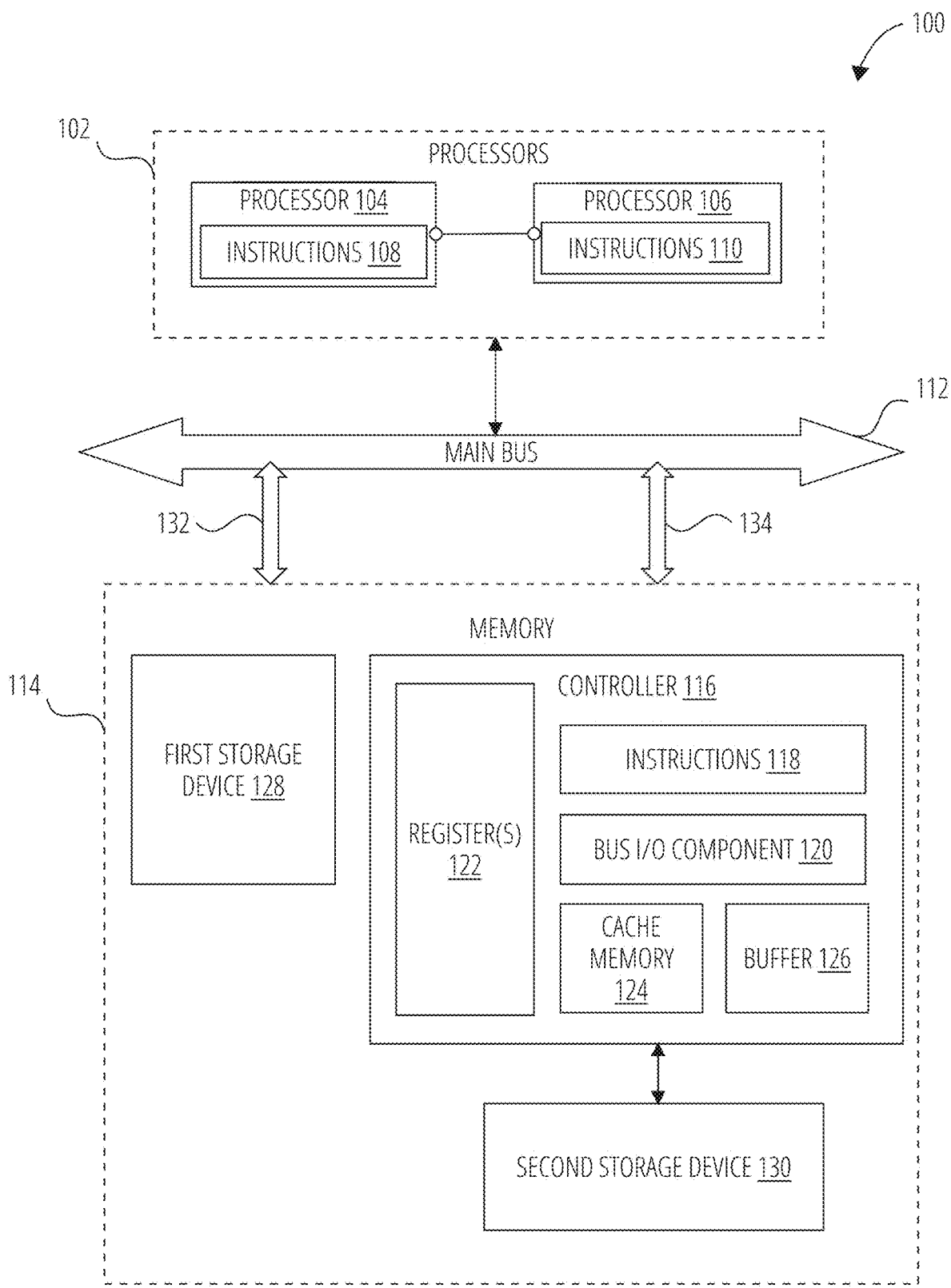
FIG. 1 is a diagrammatic representation of a computing system within which instructions for causing the computing system to perform any one or more of the methodologies discussed herein may be executed, according to some examples.

FIG. 1 is a block diagram illustrating the components that may be present in a computing system 100, according to some examples. The components may allow the computing system 100 to function in accordance with the techniques discussed herein. As will be appreciated, the various functional blocks shown in FIG. 1 may include hardware elements (including application specific or generic circuitry), software elements (including computer code stored on a machine-readable medium) or a combination of both hardware and software elements. It should further be noted that FIG. 1 is merely one example of a particular implementation and is merely intended to illustrate the types of components that may be present in a computing system 100.

The computing system 100 may include processors 102 and memory 114, which may be configured to communicate via a main bus 112. In some examples, the processors 102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another Processor, or any suitable combination thereof) may include, for example, a Processor 104 and a Processor 106 that respectively execute the instructions 108 and instructions 110. The term "Processor" is intended to include multi-core processors that may comprise two or more independent processors (sometimes referred to as "cores") that may execute instructions contemporaneously. Although FIG. 1 shows multiple processors 102, the computing system 100 may include a single processor with a single core, a single processor with multiple cores (e.g., a multi-core processor), multiple processors with a single core, multiple processors with multiple cores, or any combination thereof.

The main bus 112 may include a data bus (dbus) 132 or a control bus (cbus) 134. The data bus (dbus) 132 may be configured to carry data between components of the computing system 100. The control bus (cbus) 134 may be configured to carry control signals between different components of the computing system 100.

The memory 114 may include a controller 116, a first storage device 128, and a second storage device 130. The first storage device 128 may be accessible by the processors 102 via the main bus 112 or the data bus (dbus) 132. The controller 116 may be communicatively coupled to the processors 102 via the main bus 112. In some examples, the controller 116 is coupled to the main bus 112 via the data bus (dbus) 132 and/or the control bus (cbus) 134. In some examples, the second storage device 130 may be accessible to the processors 102 via the controller 116. The memory 114 may include a non-transitory computer-readable storage medium that stores instruction(s) for causing the computing system to perform any one or more of the methodologies discussed herein.

The controller 116 may store the instructions 118 embodying any one or more of the methodologies or functions described herein. The instructions 118 may also reside, wholly or partially, within the first storage device 128, within second storage device 130, within the processors 102, or any suitable combination thereof, during execution thereof by the computing system 100.

The controller 116 may include a BUS input or output (I/O) component 120, a register 122, a cache memory 124, or a buffer 126. In some examples, the controller 116 determines where data is stored, retrieved, or transmitted among the cache memory 124, the buffer 126, and the second storage device 130. In some examples, the controller 116 manages the communication interface between the processors 102 and the second storage device 130. In some examples, the controller 116 coordinates with the BUS I/O component 120 to regulate the timing or sequence of data exchanges.

In some examples, the controller 116 may be coupled to the main bus 112 via both the data bus (dbus) 132 and the control bus (cbus) 134. An exchange of a control signal may occur via the control bus (cbus) 134, and other data exchanges may occur via the data bus (dbus) 132 or the control bus (cbus) 134.

The BUS I/O component 120 may provide a pathway for data to travel among various components. In some examples, the BUS I/O component 120 handles the input or output of data. The input of data may be referred to as writing (e.g., storing, saving) data in the memory 114. The output of data may be referred to as reading (e.g., fetching, accessing, retrieving, obtaining, extracting) data from the memory 114. The input or output of data may also be referred to as data exchange, data transfer, or data transmission. In some examples, the BUS I/O component 120 manages data exchanges between the main bus 112 and the memory 114. The BUS I/O component 120 may interpret or execute a read request or a write request from the processors 102, coordinate data transfers between the cache memory 124, buffer 126, first storage device 128, or second storage device 130. The BUS I/O component 120 may be configured to implement different protocols for different modes of data exchange. For example, the BUS I/O component 120 implements a burst mode for accessing or storing sequential data or a data batch comprising a plurality of data items. Sequential data may be data associated with substantially proximate memory addresses. For example, memory addresses, 0x1000, 0x1001, 0x1002, are substantially proximate memory addresses because these memory addresses are next to each other in a continuous manner. In some examples, substantially proximate memory addresses do not need to be sequential, instead substantially proximate memory addresses may be separated by a predefined number of memory addresses. For example, memory addresses 0x1000 and 0x1004 are substantially proximate, separated by only a predefined number of memory addresses (e.g., 4). In some examples, substantially proximate memory addresses may include multiple memory addresses that fall within a predefined range. For another example, the BUS I/O component 120 implements a single-transfer mode for accessing or storing data in random memory locations.

In some examples, the memory address provided in the write request is translated, decoded, or converted, by the BUS I/O component 120, into an address format used by the selected storage device so that the memory address can be properly interpreted or the data can be stored in a correct memory location.

The register 122 may serve as a small, fast storage location that holds or manages data or controls information related to operations performed by the controller 116. The register 122 may store control signals or configuration settings that dictate how to control the various storage devices, such as memory timings, refresh rates, and different modes of data exchange. The register 122 may hold memory addresses, enabling the controller 116 to determine where data should be read from or written to the memory 114. In some examples, the register 122 in the controller 116 temporarily holds data being transferred between the memory 114 and the processors 102 or other system components, ensuring efficient data flow. In some examples, the register 122 stores the status of data exchanges, providing feedback on whether a data exchange has been completed successfully or an error has occurred. In some examples, register 122 may include a command for causing the one or more storage devices to perform an operation, such as reading, writing, or refreshing.

In some examples, the register 122 includes configuration registers that comprise preconfigured command codes that enable the controller 116 to communicate with the second storage device 130. The configuration registers may store parameters such as timing configurations, refresh rates, or access modes for the second storage device 130. The configuration registers may include settings for cache policies, buffer management, or address mapping schemes. In some examples, the controller 116 uses the configuration registers comprising different preconfigured command codes to communicate with the second storage device 130 produced (e.g., manufactured) by different manufacturers.

The cache memory 124 may be configured to store data or instructions for quick retrieval. In some examples, the cache memory 124 stores data or instructions with a size smaller than or equal to a first predetermined size threshold. The cache memory 124 may implement various caching algorithms such as write-through, write-back, or write-around policies. In some examples, the cache memory 124 supports prefetching to preload data that is likely to be accessed soon. In some examples, the cache memory 124 supports features like cache coherency protocols to ensure data consistency across multiple processors (e.g., Processor 104 and Processor 106). The cache memory 124 may be implemented as a partition of the first storage device 128. The cache memory 124 may be a piece of static random access memory (SRAM) different from the first storage device 128.

The buffer 126 may be configured to store data being transferred between different components of the computing system 100. In some examples, the buffer 126 may temporarily hold data during data transfers. In some examples, the buffer 126 may be used in the burst mode. For example, the burst mode is used when transferring a data batch, such as image data. For example, the burst mode is used when data corresponds to a plurality of addresses, the plurality of addresses comprising more than a predetermined number threshold of memory addresses. The buffer 126 may implement circular buffer algorithms, which may allow for continuous data streaming without the need to reallocate space constantly. The buffer 126 may assist in data rate matching between components with different processing speeds. For example, the buffer 126 temporarily stores data from the processors 102 before the data can be written to one of the one or more storage devices. In some examples, the buffer 126 may be used for assembling or disassembling data packets to facilitate more efficient data exchange with the second storage device 130. In some examples, the buffer 126 works with the cache memory 124 or the BUS I/O component 120 to optimize data movement within the memory 114. The buffer 126 may help reduce latency in data transfers and may contribute to more efficient use of the main bus 112 bandwidth.

The first storage device 128 may be a storage area for frequently accessed data or instructions within the computing system 100. The first storage device 128 may include a static random access memory (SRAM). The first storage device 128 may be coupled to the processors 102 via the main bus 112 or the data bus (dbus) 132. In other words, the processors 102 may perform data exchange with the first storage device 128 directly. In some examples, when the computing system 100 is implemented as a system-on-chip (SoC), the first storage device 128 is integrated into the computing system 100. For example, the first storage device 128 is built directly onto the same semiconductor die or chip as the processors 102. In some examples, the first storage device 128 provides rapid access to stored information (e.g., data). In some examples, the first storage device 128 may support simultaneous read and write operations, potentially improving overall performance. In some examples, the first storage device 128 may be organized into multiple partitions, allowing for parallel access to the multiple partitions. For example, the one or more partitions of the multiple partitions are used as the cache memory 124 or buffer 126 of a controller 116. The first storage device 128 may implement error correction code (ECC) functionality to maintain data integrity. In some examples, the ECC functionality detects or corrects certain types of data errors, enhancing the reliability of stored information.

The second storage device 130 may provide storage space for the computing system 100. The second storage device 130 may include a pseudostatic random-access memory (PSRAM). In some examples, the second storage device 130 has a capacity attribute (e.g., storage space, storage size) larger than a capacity attribute of the first storage device 128; however, the first storage device 128 has a greater (e.g., better) performance in a performance metric. For example, the performance metric includes a read or write speed. For example, a read and write speed of the first storage device 128 is greater than that of the second storage device 130. For another example, the performance metric includes latency or bandwidth. In some examples, the second storage device 130 is coupled to the computing system 100 by connecting the second storage device 130 externally. The second storage device 130 comprising a PSRAM may be coupled to the computing system 100 externally, for example, through a quad serial peripheral interface (QSPI). In some examples, the second storage device 130 is directly integrated into the computing system 100 by sharing the same circuit or being embedded within the same semiconductor die or chip as the processors 102.

The second storage device 130 may support different modes to enhance performance in different scenarios. In some examples, the second storage device 130 may also support a burst mode for data transfer, allowing transmission of a data batch in a single operation. To reduce power consumption, particularly during periods of inactivity, the second storage device 130 may implement power-saving features. In some examples, the power-saving features include partial array refresh, where only portions of the second storage device 130 containing data are refreshed, conserving energy. In some examples, the second storage device 130 utilizes temperature-compensated self-refresh mechanisms, adjusting refresh rates based on ambient temperature to optimize power usage while maintaining data integrity. The second storage device 130 may work in conjunction with the one or more storage devices, such as the first storage device 128, to leverage the strengths of each storage device, potentially improving overall system performance or energy efficiency.

By using a hybrid setup that includes a first storage device 128 and a second storage device 130, the computing system 100 may provide fast access to frequently used or critical data or instructions using the first storage device 128 and may provide sufficient storage space for other types of data using the second storage device 130. In some examples, a cost per bit of storage space for SRAM may be higher than that of the PSRAM. Therefore, the hybrid setup may lower an overall manufacturing cost for the computing system 100. In conclusion, the hybrid setup may allow the computing system 100 to balance speed, storage capacity (e.g., storage space), power efficiency, and cost-effectiveness.

Figure 2:
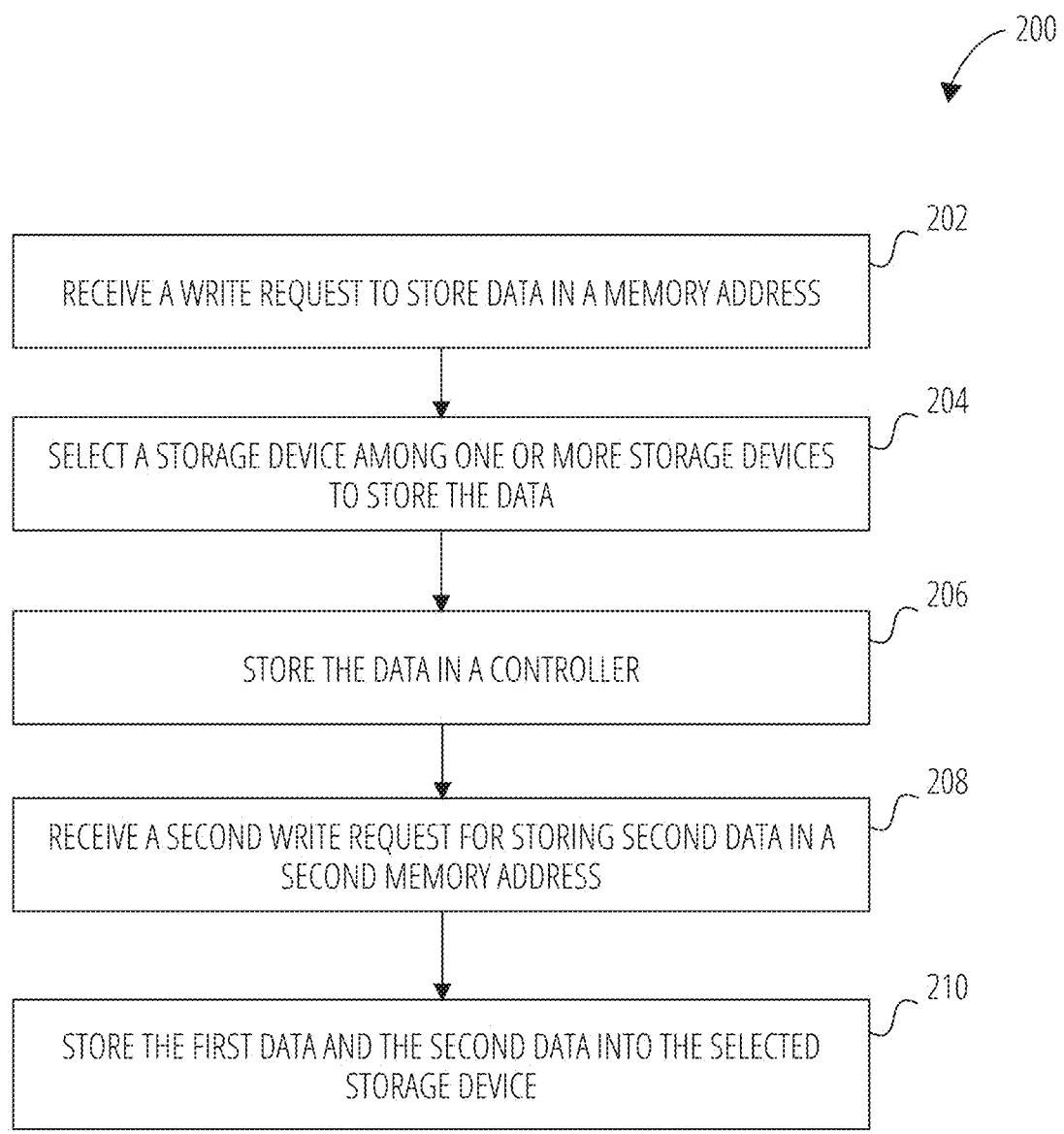
FIG. 2 is a flowchart illustrating a method for writing data, according to some examples.

FIG. 2 is a flowchart illustrating a method for data exchange in a computing system, according to some examples.

In block 202, the processors 102 may receive (e.g., execute) a write request to store data in a memory address. The write request may include the memory address where the data needs to be written.

In block 204, the processors 102 may select a storage device from among one or more storage devices to store the data. The one or more storage devices may include the first storage device 128 and the second storage device 130. In some examples, the selection may be made based on the memory address provided in the write request. For example, data that include memory addresses ranged from a first address to a second address are configured to be written into the first storage device 128; data that include memory addresses ranged from a third address to a fourth address are configured to be written into the second storage device 130.

In some examples, the selection is made based on a set of rules. The set of rules determine the selection of the storage device based on data size, data type, and other factors. The set of rules may be designed to optimize data storage based on the characteristics of the one or more storage devices, such as access speed, latency, power consumption, and storage capacity. In some examples, the processors 102 select the first storage device 128 to store data based on the data transgressing a second predetermined size threshold. In some examples, the processors 102 select the second storage device 130 based on the data transgressing the second predetermined size threshold. In some examples, the processors 102 select a storage device based an access frequency. For example, a counter data configured to count the number of occurrences of a particular event may require frequent access. A memory address associated with the counter data falls within an address range associated with the first storage device 128. A memory address associated with data may be predetermined. For example, a memory address associated with data is predetermined to be associated with the second storage device 130.

In some examples, the set of rules may be determined using machine learning algorithms to predict data exchange patterns and optimize data placement between the first storage device 128 and the second storage device 130. The data exchange patterns may be collected through logs generated by the computing system 100. The machine learning algorithms may analyze historical access patterns, including frequency of data access, temporal and spatial locality, data types, and data dependencies. By learning from data exchange patterns, the set of rules may adjust data placement strategies to optimize the placement of data. The machine learning models may be continuously updated based on newly generated logs indicating new exchange patterns, the set of rules may be adaptively optimized, potentially improving overall performance and energy efficiency in the computing system 100.

In some examples, the computing system 100 splits larger data cross multiple storage devices. For example, a data to be stored comprises a graphical user interface that includes one or more interactive buttons and a background graphic. The processors 102 may select the first storage device 128 to store the one or more interactive buttons and select the second storage device 130 to store the background graphic, which does not require frequent access. In these examples, the computing system 100 leverages the faster access speed of the first storage device 128 for the interactive elements that may require frequent updates or interactions, while utilizing the larger capacity of the second storage device 130 for the less frequently accessed background graphic. For example, responsive to a user interacting with a button, the processors 102 can quickly retrieve and update the button's state from the first storage device 128, ensuring responsive performance of the graphical user interface. Meanwhile, the background graphic, which remains static after initial loading, can be efficiently stored in the second storage device 130 without impacting responsiveness. This approach helps balance performance and capacity requirements for the graphical user interface, potentially optimizing both system responsiveness and storage utilization in resource-constrained devices like IoT or SoC systems.

In response to selecting the first storage device 128 to be the storage device, the first storage device 128 may store the data. In some examples, in response to selecting the first storage device 128 as the storage device, the processors 102 instructs, via the main bus 112 or the data bus (dbus) 132, the first storage device 128 to write the data. In response to selecting the second storage device 130 to be the storage device, the controller 116 may receive the write request. In some examples, the controller 116 determines where to store the data. For example, the controller 116 may override the write request to store the data in the second storage device 130 by temporarily storing the data in a cache memory 124 or a buffer 126.

In block 206, the controller 116 stores the data in a cache memory (e.g., cache memory 124). The second storage device 130 storage devices may perform a prerequisite operation in response to each write operation. This prerequisite operation may be referred to as an overhead. In some examples, a prerequisite operation includes energizing memory cells, configuring an operation mode, or translating a memory address to a physical address corresponding to a memory cell. Writing a larger data set may be more efficient than writing a smaller data set. By combining multiple write operations, the number of individual write cycles and associated overheads may be reduced, thereby improving overall performance or efficiency. Writing data associated with substantially proximate memory addresses may be more efficiency because the overhead may be shared when writing the data in the memory location. In some examples, the controller 116 accumulates multiple write operations by storing the data to be written in a cache memory 124 or buffer 126. In some examples, the controller 116 causes flushing of the cache memory 124 by writing data stored in the cache memory 124 to the second storage device 130. For example, the controller 116 causes flushing of the cache memory 124 at a predetermined frequency. For another example, the controller 116 causes flushing of the cache memory 124 based on an intelligent flushing policy. The intelligent flushing policy may be determined based on a fullness of the cache memory 124, a data age, or access patterns.

In block 208, the processors 102 may receive a second write request for storing second data in a second memory address. The write request, data, and memory address mentioned in reference to block 202 may be referred to as a first write request, a first data, and a first memory address, respectively. The second write request may be in the same format as the first write request. In response to receiving the second write request, the processors 102 may perform the method in block 204 to select a storage device among the one or more storage devices. In some examples, in response to the second storage device 130 being selected as the storage device, the controller 116 receives the second write request for storing the second data in the second memory address.

In block 210, the controller 116 may cause the second storage device 130 to store the first data and the second data. In some examples, the controller 116 causes the second storage device 130 to store the first data and the second data based on an accumulated size exceeding the first predetermined size threshold. For example, the second storage device 130 stores the first data and the second data in response to an accumulated size of the first data and the second data exceeding the first predetermined size threshold. In some examples, the controller 116 causes the second storage device 130 to store the first data and the second data based on cache lines within the cache memory 124 are substantially filled. In some examples, the controller 116 causes the second storage device 130 to store the first data and the second data in response to a number of available cache lines in the cache memory 124 transgresses a prespecified number (e.g., 1). In some examples, the controller 116 causes the second storage device 130 to store the first data and the second data based on the first memory address and the second memory address are substantially proximate memory addresses. For example, the first data and the second data correspond to substantially proximate memory addresses, an overhead to storing in the second storage device 130 is shared between the writing the first data and the second, improving efficiency. In some examples, controller 116 employs an intelligent cache eviction policy that considers access frequency when deciding which cache lines to evict. Instead of evicting data only when the cache lines are substantially full (e.g., the number of available cache lines in the cache memory 124 transgressing the prespecified number), the controller 116 retains frequently accessed data in the cache memory 124, even if other less frequently accessed data has been in the cache memory 124 for a longer time, thereby prioritizing the retention of frequently accessed data in the faster cache memory 124 rather than moving the data to the slower second storage device 130. By implementing such access frequency-based eviction policies, the computing system 100 may potentially optimize storage, reducing unnecessary data transfers between cache memory 124 and the second storage device 130, and improve overall system performance.

In some examples, the controller 116 implements a read-before-write mechanism for storing a new data batch in one or more substantially proximate memory addresses. The read-before-write mechanism includes: receiving a write request including a new data batch that comprises a plurality of data items associated with one or more substantially proximate memory addresses; reading a current data batch in the one or more substantially proximate memory addresses from the second storage device 130; storing the current data batch to the first storage device 128; updating the current data batch with the new data batch, obtaining an updated data batch; and writing the updated data batch to the second storage device. The read-before-write mechanism may allow the controller 116 to efficiently write data batches in substantially proximate memory addresses by leveraging the faster write speed of the first storage device 128 (e.g., SRAM) while optimizing write operations to the larger, but slower, second storage device 130 (e.g., PSRAM).

In some examples, the controller 116 implements a direct-write mechanism for storing a new data batch in one or more substantially proximate memory addresses. The direct-write mechanism includes writing the new data batch in the second storage device 130 directly based on determining that a number of the one or more substantially proximate memory addresses transgressing a predetermined number threshold.

In some examples, the processors 102 implements a data lifecycle management mechanism that tracks the age and access patterns of stored data. The processors 102 may monitor and analyze the frequency of data access, the time since last access, and other relevant metrics for data stored in the first storage device 128 and the second storage device 130. Based on this analysis, the processors 102 may identify data stored in the first storage device 128 that has become less frequently accessed or has not been accessed for a specified period. In response to making the identification, the processors 102 may initiate a data migration process to move the identified data from the first storage device 128 to the second storage device 130. The processors 102 may coordinate with the controller 116 to execute this data migration process efficiently. For example, the processors 102 reads the identified data from the first storage device 128, instruct the controller 116 to write the identified data in the second storage device 130. In response to receiving the instruction from the processors 102 to write the identified data to the second storage device 130, the controller 116 may temporarily store the identified data in the cache memory 124 or buffer 126. The controller 116 may write the identified data to the second storage device 130 according to the techniques described herein. In some examples, the data migration process may be performed during periods of low system activity to minimize impact on overall system performance. In some examples, the processors 102 may update address(es) associated with the identified data to reflect the new location of the migrated data in the second storage device 130, ensuring that subsequent read or write requests for the migrated data are directed to the correct storage device. The processors 102 may also implement a reverse migration process for data that becomes frequently accessed again. In response to determining that a subset of data stored in the second storage device 130 begins to show increased access frequency, the processors 102 may initiate a migration of the subset of data to the first storage device 128 to improve access speed for the subset of data that is frequently accessed. By implementing this data lifecycle management mechanism, the processors 102 may help maintain optimal performance for frequently accessed data while efficiently utilizing the larger capacity of the second storage device 130 for less active data. This approach may contribute to overall system efficiency, potentially improving performance and energy usage in resource-constrained devices like IoT or SoC systems.

In some examples, the controller 116 may implement a data compression mechanism that compresses data stored in the cache memory 124. This approach may allow for more efficient utilization of the cache memory 124 or the second storage device 130. The compression algorithm may be chosen based on the data type and the characteristics of the data stored in the cache memory 124. For example, the controller 116 may employ lightweight compression techniques that offer a balance between compression ratio and computational overhead, such as LZ77 or LZ78 algorithms. The lightweight compression techniques may provide some level of compression while maintaining quick access times. Traditional systems may be reluctant to implement compression techniques because the computational overhead associated with compression and decompression operations may consume valuable processing resources, potentially affecting overall system responsiveness in resource-constrained devices. In some examples, the controller 116 may perform data compression in the cache memory 124 during periods of low system activity or when the computing system 100 is relatively idle so that system performance during high-demand periods is not impacted. Controller 116 may implement adaptive compression for data in the cache memory 124, whereas controller 116 may dynamically adjust a compression level based on factors such as a current load, available space in the cache memory 124, or access patterns associated with the data. For example, during periods of high utilization of the cache memory 124, the controller 116 may apply more aggressive compression to optimize cache memory 124 usage, while during low-utilization periods, the controller 116 may prioritize faster access by using lighter compression or no compression at all.

By compressing data in the cache memory 124, the controller 116 may potentially increase the amount of data that can be held in the cache, reducing the frequency of data transfers between the cache memory 124 and the slower storage devices, such as the second storage device 130. This approach may help optimize cache utilization, potentially improving overall system performance and responsiveness, particularly in resource-constrained devices like IoT or SoC systems.

Figure 3:
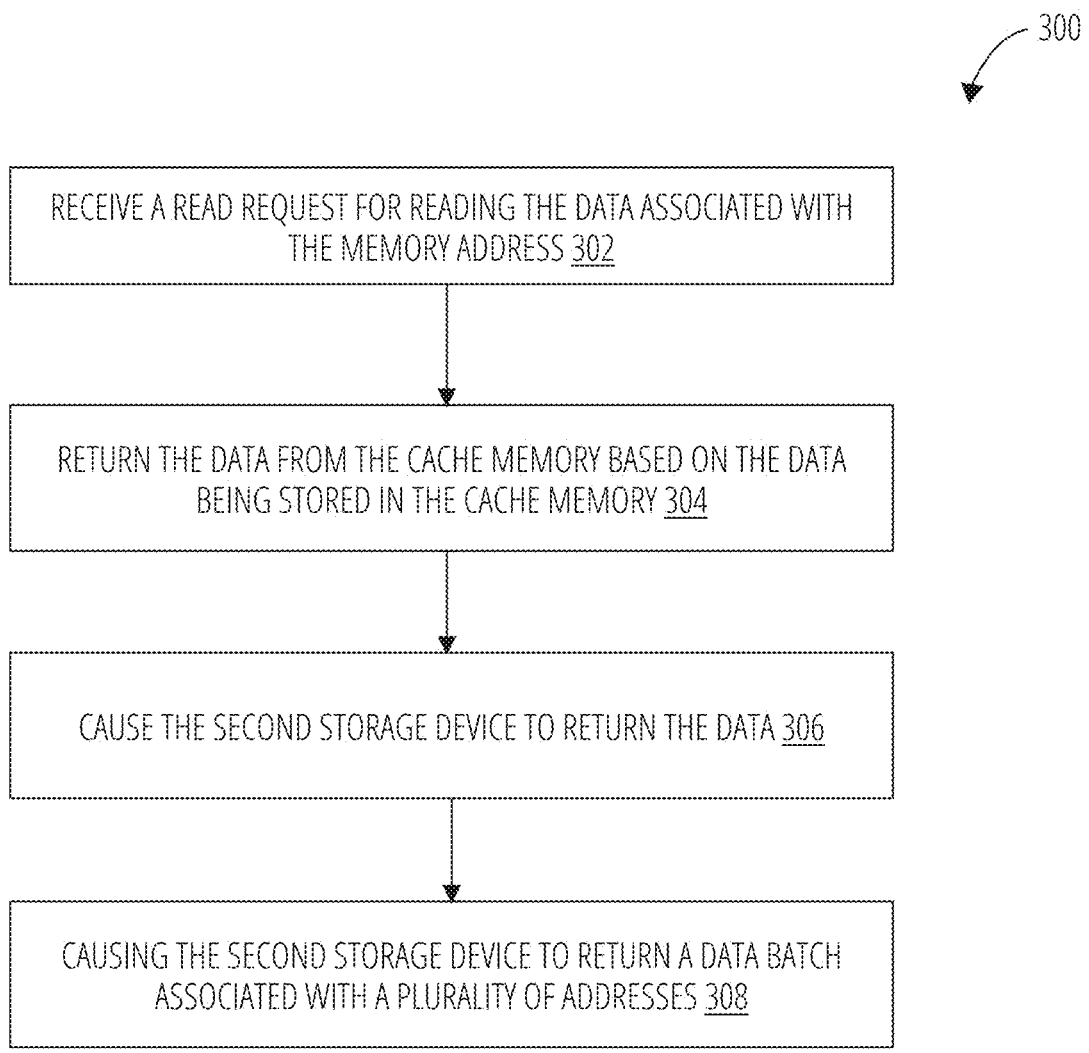
FIG. 3 is a flowchart illustrating a method for reading data, according to some examples.

FIG. 3 is a flowchart illustrating further details of the method for data exchanges in the computing system, according to some examples.

In block 302, the controller 116 may receive a read request for reading the data associated with a memory address. In some examples, the controller 116 receives the read request in response to the processors 102 determining that the data is associated with the second storage device 130 based on the memory address or a master identification.

In block 304, the controller 116 may return the data from the cache memory based on the data being stored in the cache memory. Block 304 may be performed in response to determining that the data is stored in the cache memory 124. In response to receiving the read request, the controller 116 may cause the cache memory 124 to return the data. For example, the controller 116 causes a cache memory 124 to return the data stored in the cache memory 124 in response to determining that the data is stored in the cache memory 124.

In block 306, the controller 116 may cause a second storage device 130 to return the data. In some examples, the controller 116 causes the second storage device 130 based on failing to find the data in the cache memory 124. In some examples, the controller 116 causes the second storage device 130 to return the data based on the determining that the data is stored in the second storage device 130. In some examples, the controller 116 causes the second storage device 130 to return a first data in response to storing a data batch comprising the first data and a second data in the second storage device 130. In some examples, the controller 116 may select a command code from a plurality of preconfigured command code and send the command code to the second storage device 130 causing the second storage device 130 to return the data. The plurality of command codes may include different command codes configured to establish communication (e.g., communicate) with PSRAMs produced (e.g., manufactured, made) by different manufacturers.

In block 308, the controller 116 may implement a prefetch mechanism. The prefetch mechanism may include causing a second storage device 130 to return a data batch associated with a plurality of addresses. In some examples, reading from the second storage device 130 includes a prerequisite operation. In some examples, the prerequisite operation includes decoding a memory address to locate the requested data within the second storage device 130. In some examples, the prerequisite operation includes activating appropriate memory banks or pre-charging bit lines to prepare for reading the data. In some examples, the prefetch mechanism includes retrieving a data batch comprising data associated with substantially proximate memory addresses. For example, a data batch includes a size from 16 to 256 bytes. By prefetching additional data, subsequent read requests for nearby addresses may be returned from a temporary location (e.g., cache memory 124), potentially reducing the number of PSRAM read operations or associated overheads. In some examples, the controller 116 implements an adaptive prefetching mechanism that dynamically adjusts a prefetch size (e.g., a size of a data batch to be prefetched) based on access patterns. For example, in response to detecting sequential data access, the prefetch size may be increased. In response to detecting random access patterns, the prefetch size may be decreased. The adaptive prefetching mechanism may optimize memory usage and reduce unnecessary data transfers.

The controller 116 may help maintain data consistency between multiple processors, such as between Processor 104 and Processor 106. For example, the controller 116 may determine whether the data is stored in the cache memory 124 or in the second storage device 130. When a processor sends a read request associated with a memory address, the controller 116 returns the data associated with the memory address without having the processors 102 to access the memory locations directly, preventing inconsistencies. In some examples, the controller 116 manage the translation between the memory addresses used by the processors and the physical addresses in different storage devices, maintaining a consistent view of the memory space for the processors 102.

Figure 4:
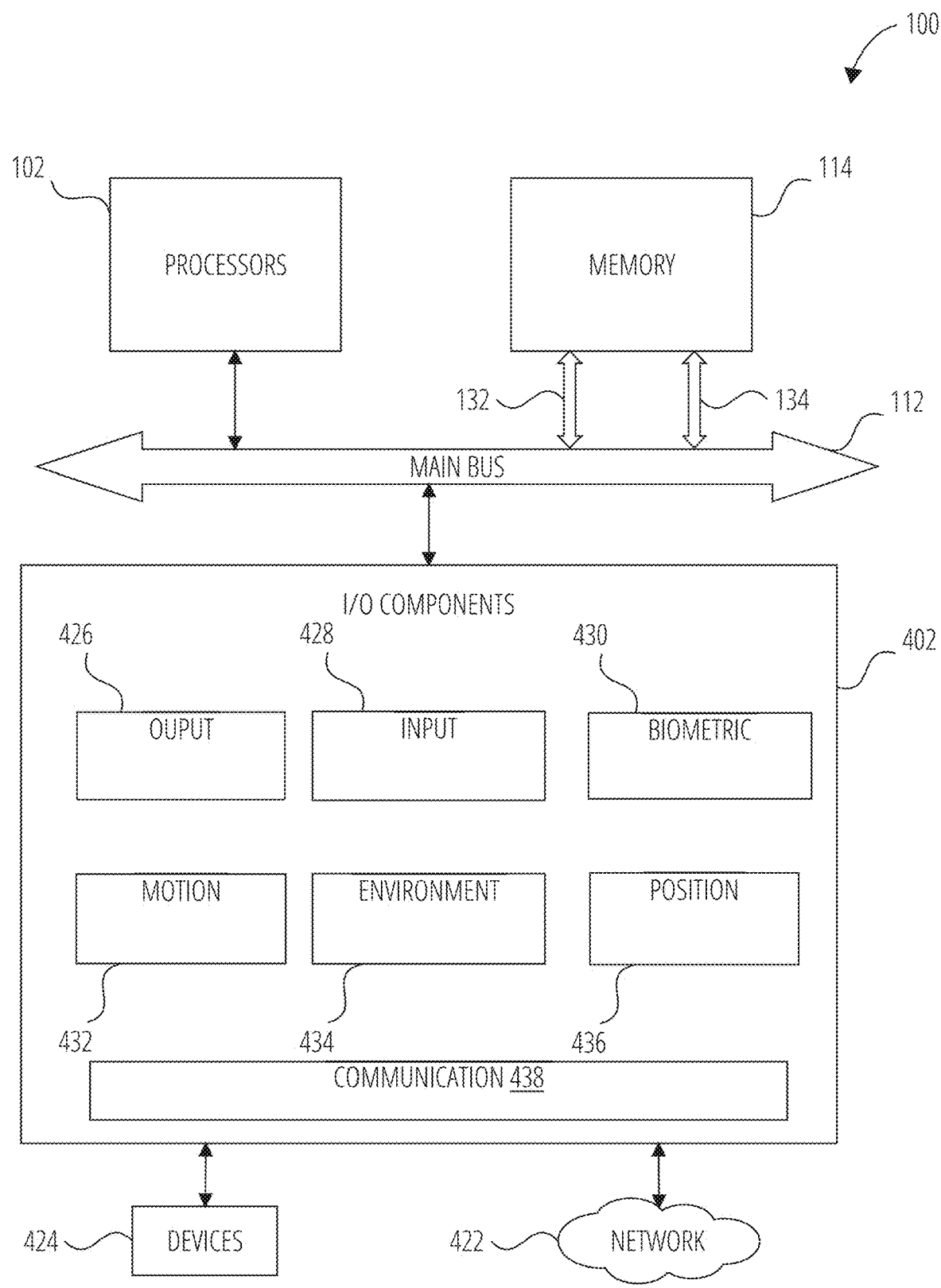
FIG. 4 is a diagrammatic representation of additional components of the computing system, according to some examples.

FIG. 4 is a diagrammatic representation of further details of the computing system 100, according to some examples.

The computing system 100 may include input/output components (I/O components) 402. The I/O components 402 may include various components to receive input, provide output, produce output, transmit information, exchange information, or capture measurements. The specific I/O components 402 included in a particular machine depend on the type of machine. For example, portable machines such as mobile phones may include a touch input device or other such input mechanisms, while a headless server machine will likely not include such a touch input device. The I/O components 402 may include many other components not shown in FIG. 4. In various examples, the I/O components 402 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), or other signal generators. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 432 include acceleration sensor components (e.g., accelerometer), gravitation sensor components, rotation sensor components (e.g., gyroscope). The environmental components 434 include, for example, one or cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 436 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the computing system 100 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, or location via detecting an NFC beacon signal that may indicate a particular location.

EXAMPLES

Example 1 is a method, comprising: generating a write request to write data into a second storage device of a memory, the memory comprising a first storage device and the second storage device, the first storage device comprising a static random access memory (SRAM) and the second storage device comprising a pseudostatic random-access memory (PSRAM), a performance metric of the first storage device being greater than the second storage device and a capacity attribute of the first storage device being smaller than the second storage device; receiving the write request by a controller coupled to the second storage device, wherein the controller comprises a cache memory that comprises one or more cache lines, a performance metric of the cache memory being greater than the second storage device; overriding the write request to write the data into the second storage device by instead writing the data into one of the one or more cache lines in the memory; and writing the data to the second storage device in response to the one or more cache lines having been substantially filled.

In Example 2, the subject matter of Example 1 includes, wherein the write request being a first write request, the data being a first data, and the method further comprises: receiving, by the controller, a second write request for storing second data in the second storage device; and storing the first data and the second data in the second storage device based on memory addresses of the first data and the second data are substantially proximate.

In Example 3, the subject matter of Examples 1-2 includes, wherein the write request being a first write request, the data being a first data, and the method further comprises: Receiving, by the controller, a second write request for storing second data in the second storage device; and storing the first data and the second data into the second storage device in response to a number of available cache lines in the cache memory transgressing a prespecified number.

In Example 4, the subject matter of Example 3 includes, receiving a read request for reading the first data from the second storage device; and causing the second storage device to return the first data in response to storing the first data and the second data in the second storage device.

In Example 5, the subject matter of Examples 1-4 includes, receiving a read request for reading the data from the second storage device; and returning the data from the cache memory based on the data being stored in the one of the one or more cache lines in the cache memory.

In Example 6, the subject matter of Examples 1-5 includes, reading a current data batch in one or more substantially proximate memory addresses from the second storage device; storing the current data batch to a first storage device; updating the current data batch with the data to obtain an updated data batch; and writing the updated data batch to the second storage device.

In Example 7, the subject matter of Examples 1-6 includes, receiving a read request for reading the data from the second storage device; and causing the second storage device to return a data batch that comprises a plurality of data items, the plurality of data items comprising the data, a plurality of addresses associated with the plurality of data items being substantially proximate memory addresses.

In Example 8, the subject matter of Examples 1-7 includes, storing a second data in the first storage device.

In Example 9, the subject matter of Examples 1-8 includes, wherein the controller further comprises a buffer, and the method further comprises overriding the write request by instead storing the data in the buffer based on a size of the data transgressing a predetermined size threshold.

Example 10 is at least one machine-readable medium including instructions that, when executed by processing circuitry, cause the processing circuitry to perform operations to implement of any of Examples 1-9.

Example 11 is an apparatus comprising means to implement of any of Examples 1-9.

Example 12 is a system to implement of any of Examples 1-9.

Example 13 is a method to implement of any of Examples 1-9.

What is claimed is:

1. A computing system, comprising:
one or more processors; and
one or more storage devices comprising a first storage device that comprises a static random access memory (SRAM) and a second storage device that comprises a pseudostatic random-access memory (PSRAM), a performance metric of the first storage device being greater than the second storage device and a capacity attribute of the first storage device being smaller than the second storage device, wherein the second storage device is coupled to controller that comprises a memory, the memory comprising a plurality of memory addresses, wherein the one or more storage devices storing instructions that, when executed by the one or more processors, configure the computing system to perform operations comprising:

receiving a plurality of write requests to write data in the second storage device;

overriding the plurality of write requests to write the data into the second storage device by instead writing the data into one or more proximate memory addresses among the plurality of memory addresses in the memory; and in response to determining that a number of the one or more proximate memory addresses transgress a predetermined threshold, writing the data as a batch into the second storage device.

2. The computing system of claim 1, wherein a performance metric of the memory being greater than the second storage device, and the instructions further configure the computing system to perform operations comprising:

receiving a write request to write data in the second storage device;

storing the data in the memory;

receiving a read request for reading the data from the second storage device; and returning the data from the memory based on the data being stored in the memory.

3. The computing system of claim 2, where in the write request being a first write request, the data being a first data, the first write request comprises a first memory address, and the instructions further configure the computing system to perform operations comprising:

receiving a second write request for storing second data in the second storage device based on a second memory address; and storing the first data and the second data into the second storage device based on the first memory address and the second memory address being substantially proximate.

4. The computing system of claim 2, wherein the write request being a first write request, the data being a first data, the memory comprises a cache memory that comprises one or more cache lines, and the instructions further configure the computing system to perform operations comprising:

receiving a second write request for storing second data in the second storage device; and storing the first data and the second data into the second storage device in response to a number of available cache lines in the memory transgressing a prespecified number.

5. The computing system of claim 4, wherein the read request is a first read request, and the instructions further configure the computing system to perform operations comprising:

receiving a second read request for reading the data from the second storage device; and causing the second storage device to return the data in response to storing the first data and the second data in the second storage device.

6. The computing system of claim 2, wherein the instructions further configure the computing system to perform operations comprising:

reading a current data batch in one or more substantially proximate memory addresses from the second storage device;

storing the current data batch to the first storage device;

updating the current data batch with a plurality of data items to obtain an updated data batch; and writing the updated data batch to the second storage device.

7. The computing system of claim 2, wherein the instructions further configure the computing system to perform operations comprising:

causing the second storage device to return a data batch that comprises a plurality of data items in response to receiving the read request, wherein the plurality of data items comprises the data, a plurality of addresses associated with the plurality of data items being substantially proximate memory addresses.

8. The computing system of claim 2, wherein the write request being a first write request, the data being a first data, and the instructions further configure the computing system to perform operations comprising:

receiving a second write request to write second data in a first storage device; and storing the second data in the first storage device.

9. The computing system of claim 2, wherein the controller comprises a buffer, and the instructions further configure the computing system to perform operations comprising:

storing the data in the buffer based on a size of the data transgressing a predetermined size threshold.

10. The computing system of claim 2, wherein the instructions further configure the computing system to perform operations comprising:

identifying information of the second storage device;

selecting a command code corresponding to the second storage device based on the identified information from a plurality of preconfigured command codes; and establishing communication between the controller and the second storage device using the selected command code corresponding to the second storage device.

11. A method, comprising:

generating a plurality of write requests to write data into a second storage device of a memory, the memory comprising a first storage device and the second storage device, the first storage device comprising a static random access memory (SRAM) and the second storage device comprising a pseudostatic random-access memory (PSRAM), a performance metric of the first storage device being greater than the second storage device and a capacity attribute of the first storage device being smaller than the second storage device;

receiving the plurality of write requests by a controller coupled to the second storage device, wherein the controller comprises a cache memory that comprises one or more proximate cache lines, a performance metric of the cache memory being greater than the second storage device;

overriding the plurality of write requests to write the data into the second storage device by instead writing the data into the one or more proximate cache lines in the memory; and writing the data as a batch to the second storage device in response to determining that a number of the one or more proximate cache lines transgress a predetermined threshold.

12. The method of claim 11, wherein the write request being a first write request, the data being a first data, and the method further comprises:
receiving, by the controller, a second write request for storing second data in the second storage device; and
storing the first data and the second data in the second storage device based on memory addresses of the first data and the second data are substantially proximate.

13. The method of claim 11, wherein the write request being a first write request, the data being a first data, and the method further comprises:
receiving, by the controller, a second write request for storing second data in the second storage device; and
storing the first data and the second data into the second storage device in response to a number of available cache lines in the cache memory transgressing a pre-specified number.

14. The method of claim 13, further comprising:
receiving a read request for reading the first data from the second storage device; and
causing the second storage device to return the first data in response to storing the first data and the second data in the second storage device.

15. The method of claim 11, further comprising:
receiving a read request for reading the data from the second storage device; and
returning the data from the cache memory based on the data being stored in the one or more cache lines in the cache memory.

16. The method of claim 11, further comprising:
reading a current data batch in one or more substantially proximate memory addresses from the second storage device;
storing the current data batch to a first storage device;
updating the current data batch with the data to obtain an updated data batch; and
writing the updated data batch to the second storage device.

17. The method of claim 11, further comprising:
receiving a read request for reading the data from the second storage device; and
causing the second storage device to return a data batch that comprises a plurality of data items, the plurality of data items comprising the data, a plurality of addresses associated with the plurality of data items being substantially proximate memory addresses.

18. The method of claim 11, further comprising storing a second data in the first storage device.

19. The method of claim 11, wherein the controller further comprises a buffer, and the method further comprises overriding the write request by instead storing the data in the buffer based on a size of the data transgressing a predetermined size threshold.

20. A non-transitory computer-readable storage medium, the computer-readable storage medium including instructions that when executed by a computing system, cause the computing system to perform operation comprising:
generating a plurality of write requests to write data into a second storage device of a memory, the memory comprising a first storage device and the second storage device, the first storage device comprising a static random access memory (SRAM) and the second storage device comprising a pseudostatic random-access memory (PSRAM), a performance metric of the first storage device being greater than the second storage device and a capacity attribute of the first storage device being smaller than the second storage device;
receiving the plurality of write requests by a controller coupled to the second storage device, wherein the controller comprises a cache memory that comprises one or more proximate cache lines, a performance metric of the cache memory being greater than the second storage device;
overriding the plurality of write requests to write the data into the second storage device by instead writing the data into the one or more proximate cache lines in the memory; and
writing the data as a batch to the second storage device in response to determining that a number of the one or more proximate cache lines transgresses a predetermined threshold.

* * * * *